(12) United States Patent
Springer et al.

(10) Patent No.: US 10,483,602 B2
(45) Date of Patent: Nov. 19, 2019

(54) BATTERY HOUSING FOR A LITHIUM-ION BATTERY

(71) Applicant: FORD GLOBAL TECHNOLOGIES, LLC, Dearborn, MI (US)

(72) Inventors: Moritz Klaus Springer, Hagen (DE); Krystian Dylong, Cologne (DE); Rainer Kiehn, Frechen (DE); Harald Stoffels, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/998,673

(22) Filed: Aug. 16, 2018

(65) Prior Publication Data

US 2019/0058229 A1    Feb. 21, 2019

(30) Foreign Application Priority Data

Aug. 16, 2017   (DE) .................. 10 2017 214 285

(51) Int. Cl.
*B60K 6/40*    (2007.10)
*B60K 6/28*    (2007.10)
(Continued)

(52) U.S. Cl.
CPC ............ *H01M 10/625* (2015.04); *B60K 1/00* (2013.01); *B60K 1/04* (2013.01); *B60K 6/28* (2013.01);
(Continued)

(58) Field of Classification Search
CPC ............ H01M 10/613; H01M 10/625; H01M 10/658; H01M 10/6562; H01M 10/6567; H01M 2/1072; H01M 2/1094; H01M 2220/20; B60K 6/28; B60K 6/40; B60K 11/02; B60Y 2200/92

See application file for complete search history.

(56) References Cited

U.S. PATENT DOCUMENTS 4,346,140 A * 8/1982 Carlson ............... B32B 5/12
                                                                442/65
4,976,327 A    12/1990 Abujudom, II et al.
(Continued)

FOREIGN PATENT DOCUMENTS

| DE | 102009035492 A1 | 2/2011 |
| DE | 102013219969 A1 | 4/2015 |
| DE | 102014213920 A1 | 1/2016 |

OTHER PUBLICATIONS

Kuper Christian Et al. Thermal Management of Hybrid Vehicle Battery Systems. Stavanger, Norway. May 13-16, 2009. 10 pages.

*Primary Examiner* — Bryan A Evans
(74) *Attorney, Agent, or Firm* — Brooks Kushman PC; David Kelley

(57) ABSTRACT

A battery housing for a lithium-ion battery of a motor vehicle for arrangement in the engine compartment of the motor vehicle includes at least one structural mechanically stable outer shell having a number of walls corresponding to the shape of the battery, at least one layer of solid thermal insulation material for protecting the battery from thermal effects from the area of the internal combustion engine, at least one first slot, which can be connected to air lines leading to the surroundings, and at least one second slot, which can be connected to lines associated with at least one cooling system of the vehicle.

19 Claims, 2 Drawing Sheets

(51) Int. Cl.
*H01M 10/625* (2014.01)
*H01M 10/613* (2014.01)
*H01M 10/6562* (2014.01)
*H01M 10/6567* (2014.01)
*H01M 10/658* (2014.01)
*B60K 11/02* (2006.01)
*H01M 2/10* (2006.01)
*B60K 1/00* (2006.01)
*B60K 1/04* (2019.01)
*B60K 11/06* (2006.01)
*B60K 17/04* (2006.01)

(52) U.S. Cl.
CPC ............... *B60K 6/40* (2013.01); *B60K 11/02* (2013.01); *B60K 11/06* (2013.01); *B60K 17/04* (2013.01); *H01M 2/1072* (2013.01); *H01M 2/1094* (2013.01); *H01M 10/613* (2015.04); *H01M 10/658* (2015.04); *H01M 10/6562* (2015.04); *H01M 10/6567* (2015.04); *B60K 2001/005* (2013.01); *B60Y 2200/92* (2013.01); *B60Y 2306/01* (2013.01); *H01M 2220/20* (2013.01)

(56) References Cited

U.S. PATENT DOCUMENTS

| | | | |
|---|---|---|---|
| 5,542,489 A | 8/1996 | Allison et al. | |
| 6,230,677 B1 | 5/2001 | Setsuda | |
| 6,840,050 B2 * | 1/2005 | Pode | B60H 1/00278 62/3.61 |
| 8,893,843 B2 * | 11/2014 | Hayano | B60L 15/007 180/232 |
| 9,337,516 B2 | 5/2016 | Klausner et al. | |
| 2004/0194489 A1 * | 10/2004 | Pode | B60H 1/00278 62/259.2 |
| 2011/0300421 A1 * | 12/2011 | Iritani | H01M 10/625 429/72 |
| 2011/0308765 A1 * | 12/2011 | Kumar | B61C 17/04 165/47 |
| 2014/0117198 A1 * | 5/2014 | Shimada | B60K 1/00 248/560 |
| 2014/0305153 A1 * | 10/2014 | Arai | H05K 7/20936 62/190 |
| 2019/0058229 A1 * | 2/2019 | Springer | H01M 10/613 |

* cited by examiner

BATTERY HOUSING FOR A LITHIUM-ION BATTERY

CROSS-REFERENCE TO RELATED APPLICATIONS

This application claims foreign priority benefits under 35 U.S.C. § 119(a)-(d) to DE Application 10 2017 214 285.5 filed Aug. 16, 2017, which is hereby incorporated by reference in its entirety.

TECHNICAL FIELD

The invention relates to a housing for a lithium-ion battery of a motor vehicle.

BACKGROUND

Lithium-ion batteries are becoming increasingly important in the motor vehicle sector. Here, they are used particularly as energy storage devices for electric and hybrid vehicles. Lithium-ion batteries have various advantages over conventional batteries, e.g. in respect of the specific energy and specific power.

However, the service life and operation of lithium-ion batteries is heavily dependent on the ambient temperature. Lithium-ion batteries should not be exposed to temperatures lower than 0° C. and higher than 60° C. and should ideally be located in a temperature window of 10° C. to 40° C. Here, the temperature sensitivity depends on the specific technology of the battery, i.e. especially on the chemistry (composition of the electrolytes, material of the electrodes etc.) and the corresponding power requirements. Some lithium-ion batteries require a ventilation device.

The disadvantages mentioned make the installation of a lithium-ion battery in a motor vehicle a complex matter. For reasons of crash safety, lithium-ion batteries are generally not installed in the engine compartment but underneath the vehicle, i.e. in the underbody region or in the trunk. In this case, connecting the lithium-ion battery to the vehicle interior likewise involves complications if the lithium-ion battery malfunctions. Moreover, monitoring the temperature of the lithium-ion battery is complex owing to long paths for coolant etc.

SUMMARY

Various embodiments provide a way of arranging a lithium-ion battery which is more efficient than conventional arrangements. Further advantageous embodiments and developments of the invention will become apparent from the disclosure of the illustrative embodiments.

A first aspect according to the disclosure relates to a battery housing for a lithium-ion battery of a motor vehicle, comprising at least one mechanically stable outer shell having a shape corresponding to the shape of the battery, at least one layer comprising a solid thermal insulation material, at least one first slot, which is connected to air lines leading to the surroundings, and at least one second slot, which is connected to lines associated with at least one cooling system of the vehicle.

The battery housing according to one or more embodiments of the disclosure is advantageous because it enables a lithium-ion battery to be arranged in the engine compartment of a motor vehicle. In this case, the mechanically stable shell serves to provide protection from mechanical action, such as may occur during a crash. The layer comprising solid thermal insulation material advantageously separates the lithium-ion battery thermally from the area of the internal combustion engine or from other heat-producing devices in the engine compartment of the motor vehicle. Furthermore, the first slot is designed to conduct air, which advantageously allows heat to be dissipated. In addition, there is the fact that the first slot forms a cavity, which also entails protection from mechanical action or intrusion. It is also possible for additional slots to be designed as air slots. Through the use of liquid or air cooling, the second slot likewise serves for the dissipation of heat when the temperature exceeds the temperature window advantageous for lithium-ion batteries or, alternatively, serves to supply heat when the temperature falls below the temperature window advantageous for lithium-ion batteries. It is also possible for additional slots to be formed for the use of coolant. The shape of the housing according to various embodiments corresponds to the shape of the battery, meaning that the number of surfaces of the housing correspond to the number of surfaces of the battery, although the housing is, of course, larger than the battery.

The mechanically stable shell can comprise one or, alternatively, a plurality of material layers. The mechanically stable shell is designed to absorb mechanical actions to prevent any component or item external to the shell from causing the shell to contact the battery, particularly during an accident, but not to undergo significant deformation during this process, thus ensuring that the lithium-ion battery protected by the battery housing is protected from mechanical damage. The material of the shell preferably comprises a metal. In a particularly preferred embodiment, the material comprises a metal, such as steel. As an alternative, the material can also be aluminum, for example. In another possible embodiment, the material comprises a plastic.

The solid thermal insulating material preferably comprises a thermoplastic. A suitable material is polystyrene, for example, particularly as a foam in the form of expanded polystyrene, or a suitable copolymer comprising styrene.

The second slot of the battery housing according to various embodiments is preferably connected to lines of the cooling system of the internal combustion engine of the vehicle, which may include air cooling, liquid cooling, or both, with air/liquid cooling spaces appropriately separated. This connection advantageously allows heating and/or cooling of the lithium-ion battery as required when the temperature is outside of a desired operating temperature range. This may include cooling of the battery when the temperature becomes too high due to the action of heat from the area of the internal combustion engine and exceeds the temperature window advantageous for lithium-ion batteries or, alternatively, allows heat to be supplied when the temperature falls below the temperature window favorable for lithium-ion batteries. In this case, a coolant flow is activated. The liquid coolant can be water or some other conventional liquid coolant. Similarly, active air cooling may be provided by a vehicle air-conditioning system, for example.

The second slot of the battery housing according to various embodiments may be connected to lines of the air-conditioning system of the vehicle. This connection advantageously allows cooling of the lithium-ion battery as required when the effect of heat from the area becomes too great and can no longer be neutralized by the layer comprising the thermal insulation material and by the ambient or passive air cooling. In this case, the connection can be such that only the air-conditioning system is connected or such that the air-conditioning system can be connected to the second slot as an alternative to the above-described activation of coolant, depending on the operating state of the corresponding motor vehicle.

The battery housing according to one or more embodiments may be an integral part of the housed battery.

The battery housing according to the invention is preferably at least partially integrated with the vehicle. In this case, the position of the battery housing can occupy the place in which a vehicle battery (i.e. a lead-acid battery) is conventionally arranged. In this case, the arrangement of the battery housing, including the lithium-ion battery housed therein, advantageously enables close-coupling to coolant lines or lines of the air-conditioning system of the vehicle. The function of the lead battery can be partially assumed by the lithium-ion battery. As a result, the lead battery supplied can be smaller than is conventional and can be arranged in some other part of the vehicle.

A second aspect according to the disclosure relates to a motor vehicle having a battery housing as disclosed herein. The advantages of the vehicle correspond to the advantages of the battery housing. In particular, the vehicle may have a hybrid drive such as a mild hybrid drive.

One or more representative embodiments are explained in greater detail with reference to the figures, in which:

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not necessarily intended to be limiting, but merely as a representative basis for teaching one skilled in the art to variously employ the embodiments.

Figure 1:
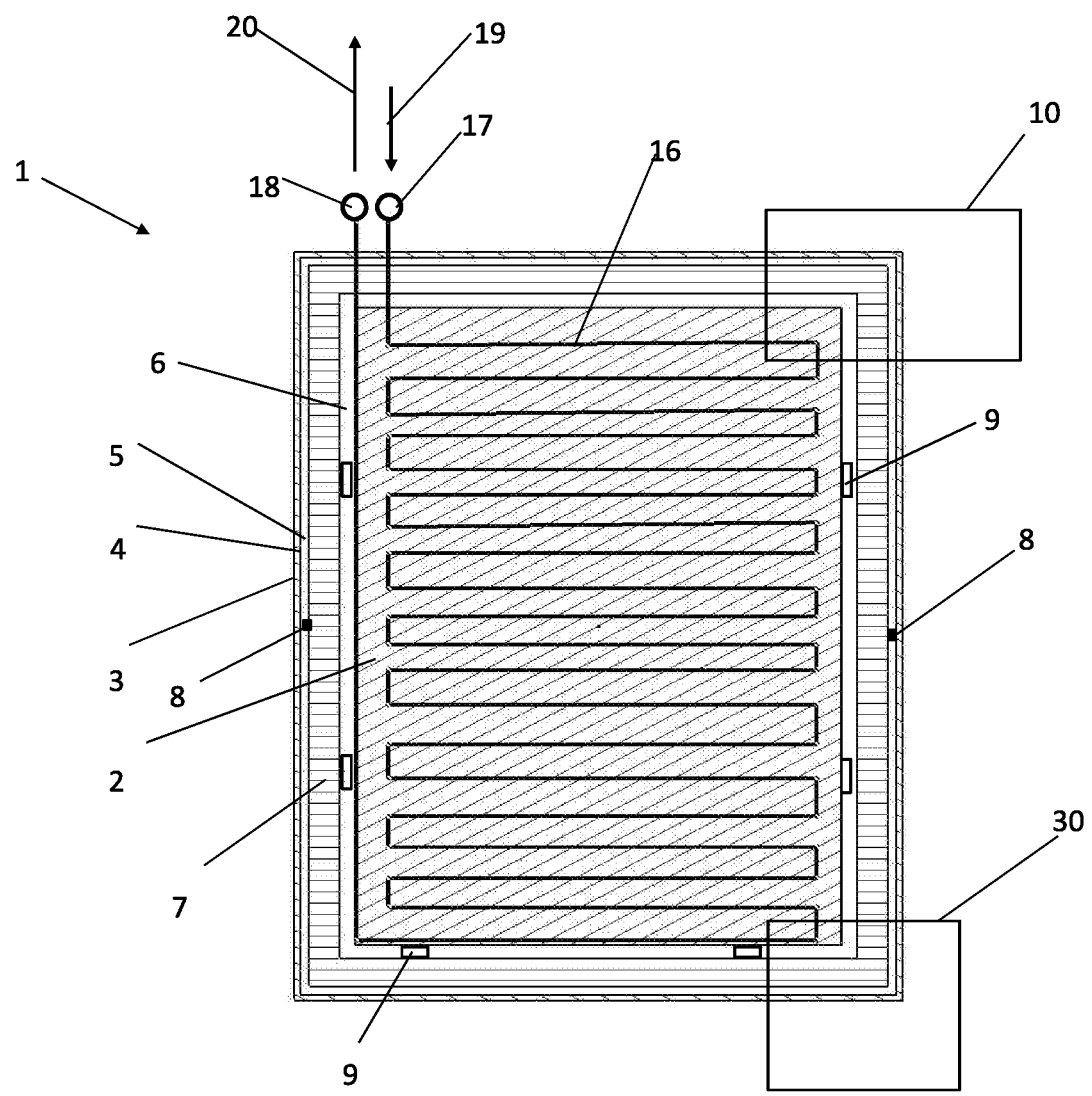
FIG. 1 shows a schematic illustration of an arrangement of a lithium-ion battery according to one embodiment of the battery housing according to the disclosure.

An arrangement 1 of a traction battery, such as a lithium-ion battery 2 of a motor vehicle with a battery housing 3 according to the disclosure is illustrated in FIG. 1. In particular, the vehicle is a motor vehicle with an electric or hybrid drive, in which the lithium-ion battery is used inter alia to drive an electric motor, e.g. in a mild hybrid drive having an internal combustion engine and an electric machine coupled to the battery and selectively operable as a traction motor or generator.

The battery housing 3 corresponds in shape to the battery 2 to be accommodated, wherein the battery housing 3 is, of course, of larger dimensions than the battery 2. In particular, the battery housing 3 is cuboidal, with a number of flat walls corresponding to the surfaces of a cuboid. On one side, the battery housing 3 is constructed with a reversibly closable wall to receive the battery 2. As an alternative, the battery housing 3 can also be open on said side. Connections are provided in the battery housing 3 for connection to the cooling lines, which may include ambient and/or cooled air lines and/or liquid cooling lines.

The battery housing 3 is delimited with respect to the outside by a structural, mechanically stable outer shell 4. In the illustration shown, the shell 4 is composed of a single layer of material but can also be composed of two or more layers of material. In one embodiment, the shell 4 can additionally have ribs and braces, which contribute to enhanced structural stability of the shell. The material of the shell 4 preferably comprises a metal. In this case, the material can be an alloy, in particular a steel, but, as an alternative, can also be composed, for example, of a particular metal, e.g. of aluminum. It is also possible for the shell 4 to comprise a plastic, and plastic and metal parts can also be assembled together.

Figure 2:
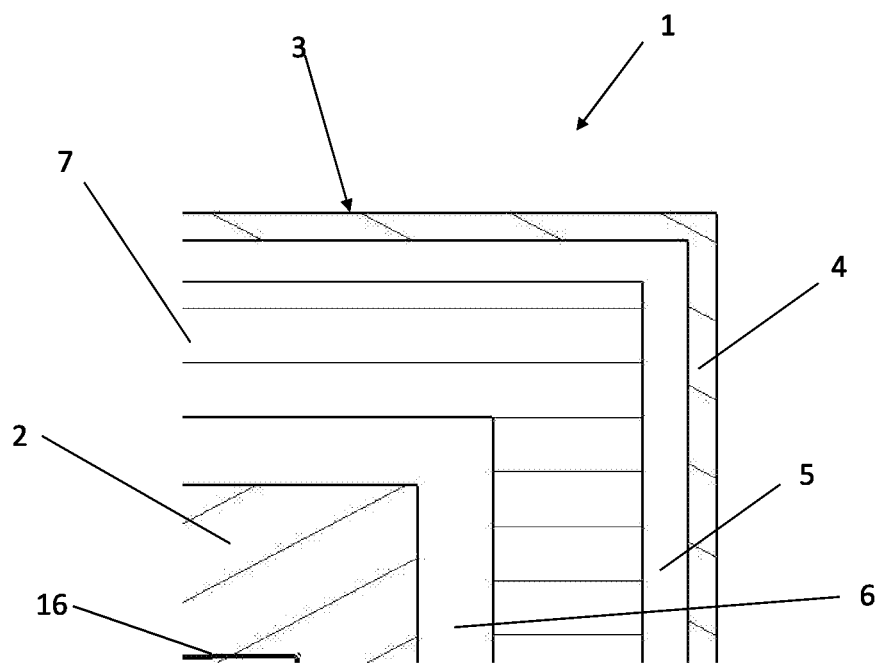
FIG. 2 shows an enlarged illustration of the area 10 of the arrangement shown in FIG. 1.

The battery housing 3 has a first slot 5 and a second slot 6. In one embodiment, both slots 5, 6 are air slots. This is clearly shown in the enlarged detail 10 of FIG. 1, which is illustrated in FIG. 2. The first slot 5 is formed between the shell 4 and a layer of solid thermal insulating material 7. The first slot 5 has braces 8 between the shell 4 and the layer 7. These serve to ensure the stability of the first slot 5 and of the entire battery housing 3. The second slot 6 is formed between the layer of solid thermal insulating material 7 and the housed battery 2. The second slot 6 has a number of supports 9 to space the battery 2 and hence to form the second air slot 6. The second slot 6 can also be delimited with respect to the area of the battery 2 in the direction of the battery 2 by a wall.

In one embodiment, the layer of solid thermal insulating material 7 comprises a thermoplastic. In this case, the layer 7 can, for example, be composed of a foam based on expanded polystyrene, e.g. an expanded polystyrene copolymer.

Figure 3:
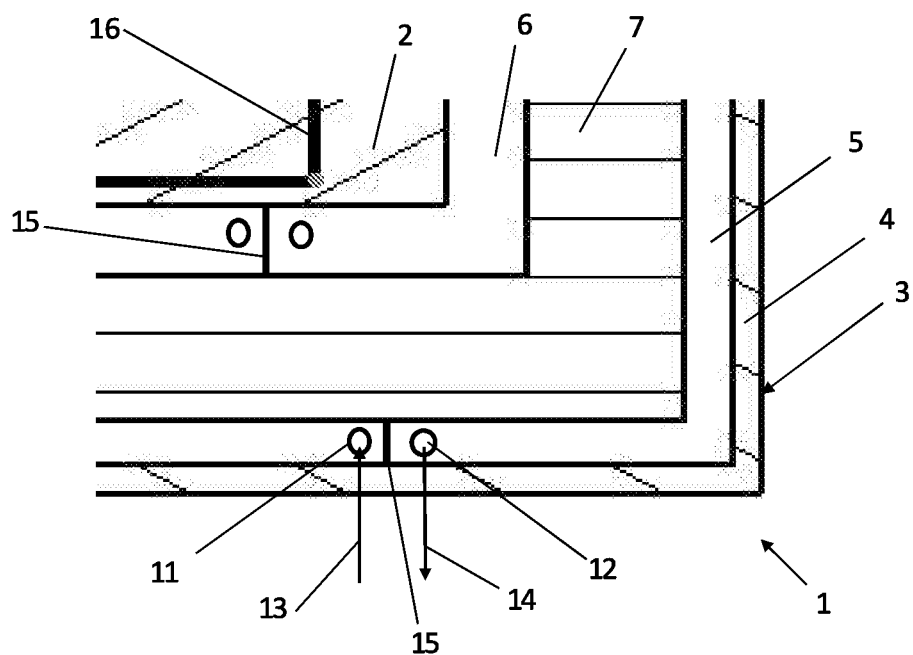
FIG. 3 shows an enlarged illustration of the area 30 of the arrangement shown in FIG. 1.

Slots 5, 6 can be fluidly connected to one another, thus allowing air circulation between the slots. Alternatively, slots 5, 6 can be fluidly isolated so that one slot provides air cooling and another slot provides liquid cooling. FIG. 3, which corresponds to the enlarged detail 30, illustrates one embodiment with slots 5, 6 connected to air lines leading to the surroundings or ambient air. For this purpose, the battery housing has a first air connection 11 and a second air connection 12. In this case, a first air line 13 is to be connected to the first air connection 11 and is used here to feed air from the surroundings into the battery housing 3. As used herein, surroundings may refer to ambient air external to the housing, which may include air external to the vehicle or engine compartment. In this case, a second air line 14 is to be connected to the second air connection 12 and is used here to discharge air from the battery housing 3 into the surroundings. For this purpose, the slots 5, 6 have dividing walls 15 (FIG. 3), which contribute to air circulation arising. It is also possible for there to be a plurality of connections, e.g. one or more connections for each of slots 5, 6.

FIG. 1 furthermore illustrates that a third slot 16, which can be connected to a cooling system of the vehicle, is formed in the battery housing 3. For this purpose, the battery housing 3 has a first coolant connection 17 and a second coolant connection 18. In FIG. 1, the third slot 16 is connected via the first coolant connection 17 to a first cooler line 19 and via the second coolant connection 18 to a second cooler line 20 of a cooling system of the motor vehicle, in particular of the internal combustion engine of the motor vehicle. The connection to the cooling system does not necessarily have to be used to cool the battery 2 but can also be used at low outside temperatures to heat the battery 2 by passing heated coolant or air into the battery housing 3.

As an alternative to lines of the coolant system of the motor vehicle, the third slot 16 can also be connected to lines of an air-conditioning system of the motor vehicle. Here too, it is the case that cold or warm air can be passed into the battery housing 3, depending on requirements.

In another embodiment of the battery housing 3, there is just one air slot in the form of the first slot 5. As an alternative, it is also possible for there to be just one air slot in the form of the second slot 6. It is also possible for the slots 5, 6 provided for ventilation to have a selectable fluid connection to the cooling system of the internal combustion engine or to the air-conditioning system. This fluid connection can also be formed between the third slot 16 and the first 5 and/or second slot 6. If the connection of the slots 5 and/or 6 to the cooling system or air-conditioning system were established, the connection of one or both slots 5, 6 to the air lines 13 and 14 would be closed. If only one slot 5 or 6 were connected to the cooling system or air-conditioning system, the fluid connection between the slots 5 and 6 would be shut off.

In another embodiment of the battery housing 3, the battery 2 is an integral part of the battery housing 3. In another embodiment, the battery housing 3 is integrated into the engine compartment of a corresponding vehicle, wherein the battery 2 can be accommodated reversibly in the battery housing 3.

While representative embodiments are described above, it is not intended that these embodiments describe all possible forms of the claimed subject matter. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   an engine disposed within an engine compartment;
   a traction motor coupled to a battery; and
   a housing disposed within the engine compartment and containing the battery, the housing comprising a shell having solid thermal insulation surrounding the battery and forming first and second slots between the battery and the shell, the first slot being configured for connecting to ambient, and the second slot being configured for connecting to a vehicle cooling system, wherein the housing further comprises braces between the shell and the solid thermal insulation.
2. The vehicle of claim 1 wherein the solid thermal insulation comprises a thermoplastic material.
3. The vehicle of claim 1 wherein the shell comprises a metal.
4. The vehicle of claim 1 wherein the shell comprises steel.
5. The vehicle of claim 1 wherein the vehicle cooling system is configured to cool the engine using liquid coolant and wherein the second slot is connected to lines of the vehicle cooling system.
6. The vehicle of claim 1 wherein the second slot is connected to lines of a vehicle air conditioning system.
7. The vehicle of claim 1 wherein the housing is an integral part of the battery.
8. The vehicle of claim 1 wherein the housing is at least partially an integral part of the vehicle.
9. The vehicle of claim 1 wherein the first slot is disposed between the shell and the solid thermal insulation, and the second slot is disposed between the solid thermal insulation and the battery.
10. The vehicle of claim 1 wherein the shell comprises a single layer of material.
11. The vehicle of claim 1 wherein the shell comprises ribs and braces.
12. The vehicle of claim 1 wherein the housing defines a third slot configured for connecting to the vehicle cooling system or ambient.
13. A battery housing configured to contain a traction battery within an engine compartment of a hybrid vehicle, the battery housing comprising:
    a metal shell; and
    solid thermal insulation configured to envelop the traction battery and spaced from the metal shell and the traction battery to define first and second slots, respectively, wherein at least one of the first and second slots is configured for connection to external airflow, and wherein the battery housing further comprises braces between the metal shell and the solid thermal insulation.
14. The battery housing of claim 13 wherein the first slot is fluidly connected to the second slot.
15. The battery housing of claim 13 wherein the first slot is configured for connection to ambient air and the second slot is configured for connection to a vehicle cooling system.
16. The battery housing of claim 15 wherein the vehicle cooling system comprises an air conditioning system.
17. A battery assembly comprising:
    a traction battery disposed within a battery housing configured to contain the traction battery, the battery housing having a structural shell with solid thermal insulation spaced from the structural shell and spaced from the traction battery to define first and second slots, respectively, and a third slot enveloped by the second slot.
18. The battery assembly of claim 17 wherein at least one of the first, second, and third slots is configured for connection to ambient.
19. The battery assembly of claim 17 wherein at least one of the first, second, and third slots is configured for connection to a vehicle cooling system.

* * * * *